Patented Mar. 26, 1940

2,194,923

UNITED STATES PATENT OFFICE 2,194,923

3-NITRO-4-ALKYL PHENOLS AND PROCESS FOR MAKING THEM

Walter G. Christiansen, Glen Ridge, N. J., assignor to E. R. Squibb & Sons, New York, N. Y., a corporation of New York No Drawing. Application March 24, 1938, Serial No. 197,855

6 Claims. (Cl. 260—622)

This invention relates to, and has for its object the provision of, certain 3-nitro-4-alkyl phenols, useful as intermediates in the preparation of active germicides, and an advantageous method of preparing them.

The 3-nitro-4-alkyl phenols of this invention are those whose alkyls have at least three carbon atoms and are preferably branched-chain. They may be prepared, for example, by the following procedure: alkyl benzenes whose alkyls have at least three carbon atoms are nitrated, the 2,4-dinitro alkyl benzene thus formed is reduced to a 2-nitro-4-amino alkyl benzene, and the amino is replaced with a hydroxy.

The following examples are illustrative of the invention:

EXAMPLE

*3-nitro-4-isopropyl phenol*

48 g. of isopropyl benzene is added dropwise to a stirred solution of 112 cc. concentrated nitric acid in 240 cc. concentrated sulfuric acid, the mixture being continuously cooled externally by means of running cold water, and the addition being at such a rate as to maintain the temperature at 30–35°. On completion of the addition, in about an hour, the mixture is heated on the steam-bath for forty-five minutes and cooled, the acid is drawn off, and the separated oil is washed twice with water and dissolved in ether, and the ether solution is washed successively with water, a ten-percent solution of sodium carbonate, and water, dried over anhydrous sodium sulfate, and filtered. After distilling off the ether, the crude 2,4-dinitro isopropyl benzene is distilled in vacuo, coming over as a pale-yellow oil at 130–135°/2–3 mm.

42 g. 2,4-dinitro isopropyl benzene is dissolved in 120 cc. absolute alcohol, and a solution of ammonium sulfide (made by mixing 144 cc. 28% ammonium hydroxide with 144 cc. absolute alcohol, saturating half the solution with hydrogen sulfide, and mixing with the other half) is added, and the mixture is boiled gently on a hot plate for forty-five minutes. The clear dark-red liquid is filtered hot from separated sulfur, and diluted with water. On cooling, orange crystals form. These are filtered off, washed, and dissolved in 150 cc. boiling concentrated hydrochloric acid. The solution is diluted with a liter of water and filtered while hot, to remove a slight insoluble residue. On cooling, the crystals of 2-nitro-4-amino isopropyl benzene hydrochloride separate out as a light-yellow feathery mass, which on being filtered off, dissolved in water, and made slightly alkaline with dilute sodium hydroxide solution, yields the bright orange 2-nitro-4-amino isopropyl benzene.

21 g. 2-nitro-4-amino isopropyl benzene is dissolved in a solution of 27 cc. concentrated hydrochloric acid in 150 cc. water. The solution being cooled to and maintained at 0°, a solution of 10 g. sodium nitrite in 30 cc. water is added dropwise with stirring, and the clear yellow solution of the diazonium salt is added dropwise to a boiling solution of 30 cc. concentrated sulfuric acid in 250 cc. water. Nitrogen is evolved, and the tarry oil that separates out is extracted with ether. The extract is washed with water and dried over anhydrous sodium sulfate. The ether being distilled off and the crude tarry oil being distilled in vacuo, there is obtained a dark-red viscous oil coming over at 124–140°/3–4 mm. This is dissolved in dilute alkali, the solution is shaken with ether to remove any alkali-insoluble material, and the alkaline solution is separated and acidified with dilute hydrochloric acid. The separated oil is extracted with ether, and the extract is washed free of acid and dried over anhydrous sodium sulfate. Distillation of the ether leaves 3-nitro-4-isopropyl phenol.

Other 3-nitro-4-alkyl phenols having at least three carbon atoms in the alkyl group can be prepared following the procedure of the preceding example. For example, 3-nitro-4-n-butyl phenol may be prepared from n-butyl benzene by the procedure of Example 1; and other 3-nitro-4-alkyl phenols, such as the n-propyl, iso-butyl, n-amyl, tertiary-butyl, and secondary-amyl, from the corresponding reactants.

The invention may be variously otherwise embodied within the scope of the appended claims.

I claim:

1. 3-nitro-4-lower-alkyl phenol wherein the alkyl group has at least three carbon atoms.

2. 3-nitro-4-branched-chain-lower-alkyl phenol.

3. 3-nitro-4-isopropyl phenol.

4. 3-nitro-4-tertiary-butyl phenol.

5. The method of preparing 3-nitro-4-lower-alkyl phenol wherein the alkyl group has at least three carbon atoms, which comprises converting an alkyl benzene having the desired alkyl group into 2,4-dinitro-lower alkyl benzene, reducing the dinitro compound to 2-nitro-4-amino-lower alkyl benzene, and replacing the amino group with a hydroxy group.

6. The method of preparing 3-nitro-4-lower-alkyl phenol wherein the alkyl group has at least three carbon atoms, which comprises nitrating an alkyl benzene having the desired alkyl group to form 2,4-dinitro-lower alkyl benzene, reducing the dinitro compound to 2-nitro-4-amino lower alkyl benzene by treatment with ammonium sulfide, and converting the amine to the corresponding phenol by diazotization and hydrolysis.

WALTER G. CHRISTIANSEN.